H. J. MARX.
WINDING MACHINE.
APPLICATION FILED OCT. 10, 1910.
1,029,703.
Patented June 18, 1912.
6 SHEETS—SHEET 2.
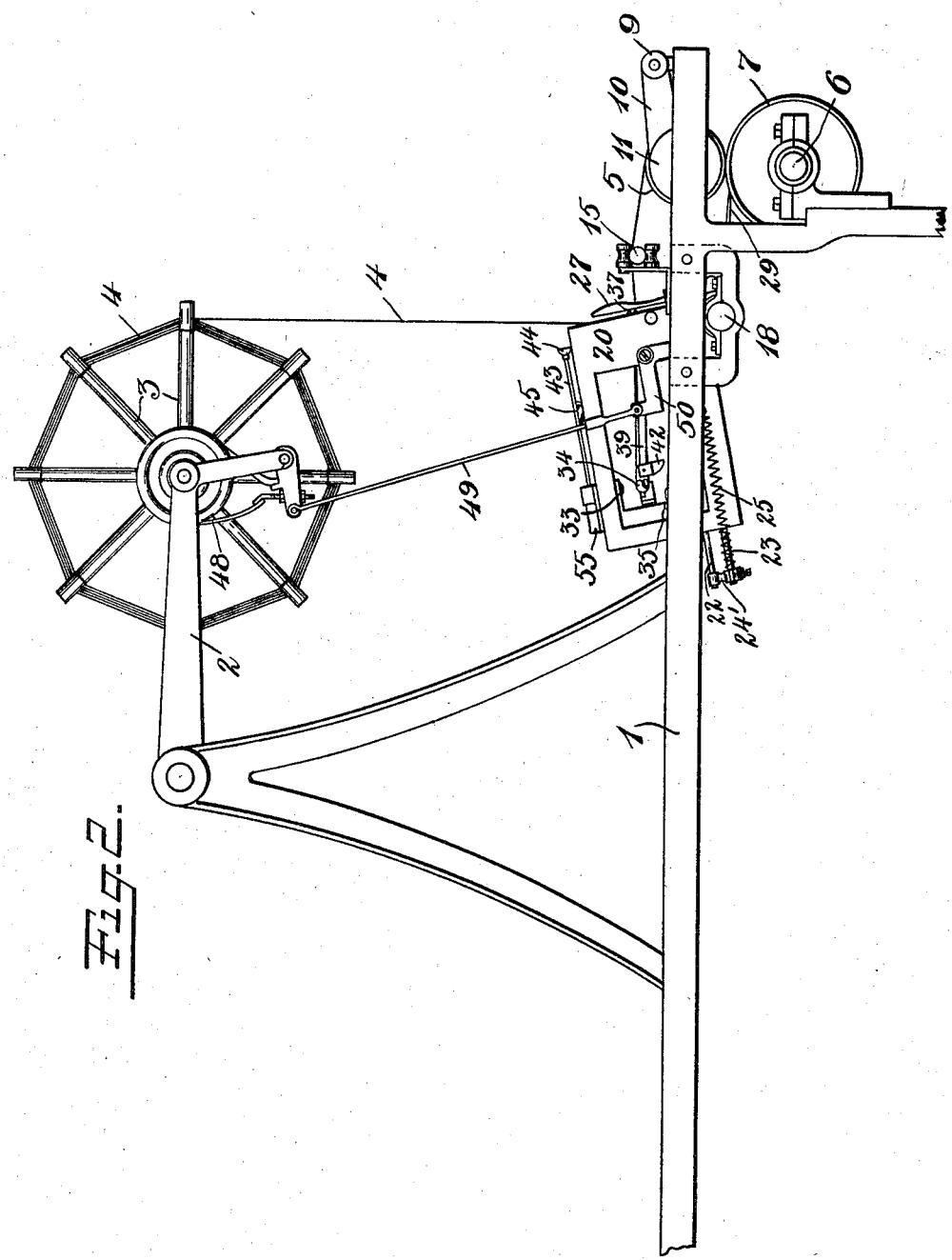

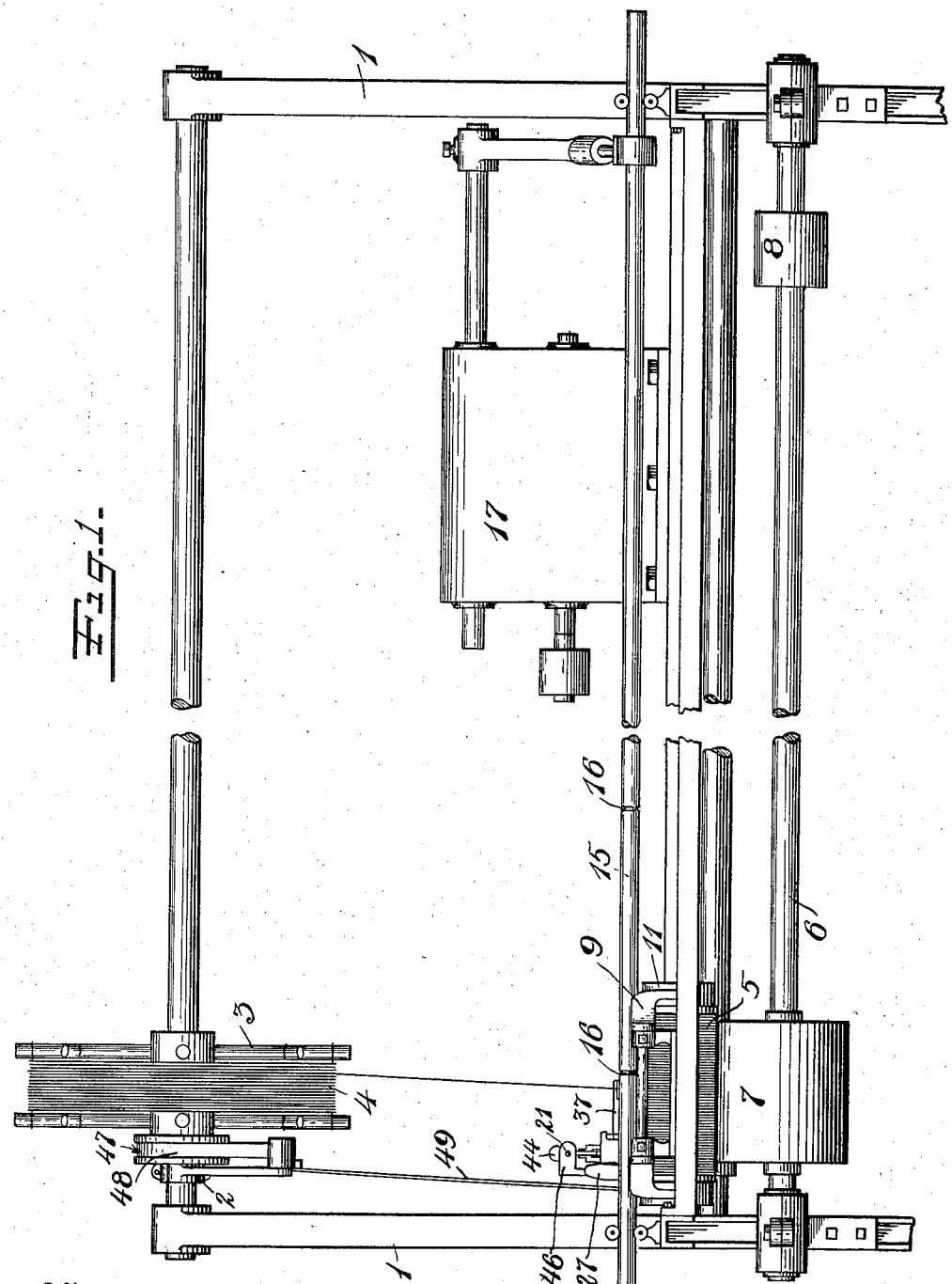

H. J. MARX.
WINDING MACHINE.
APPLICATION FILED OCT. 10, 1910.
1,029,703.
Patented June 18, 1912.
6 SHEETS—SHEET 3.
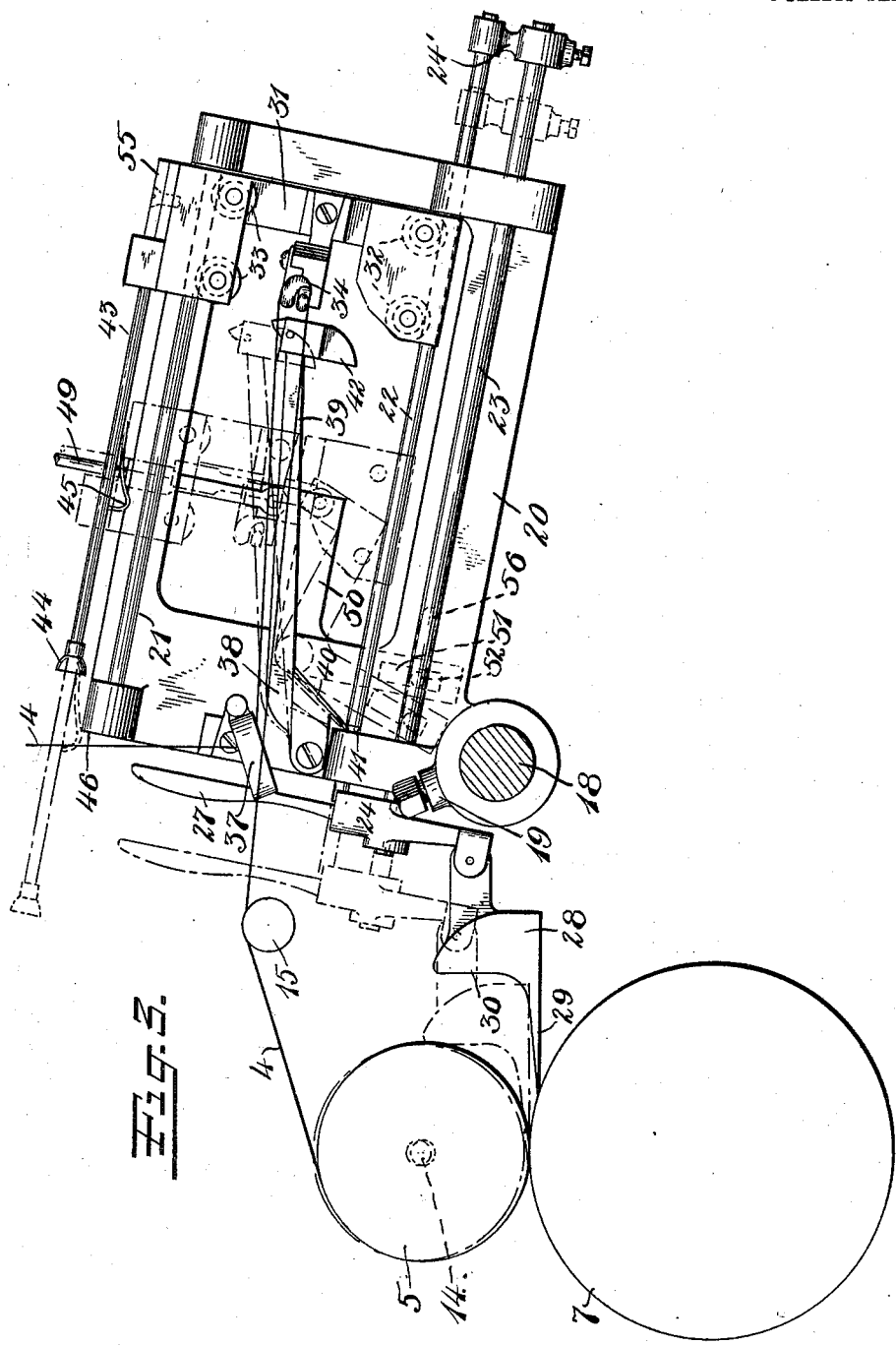

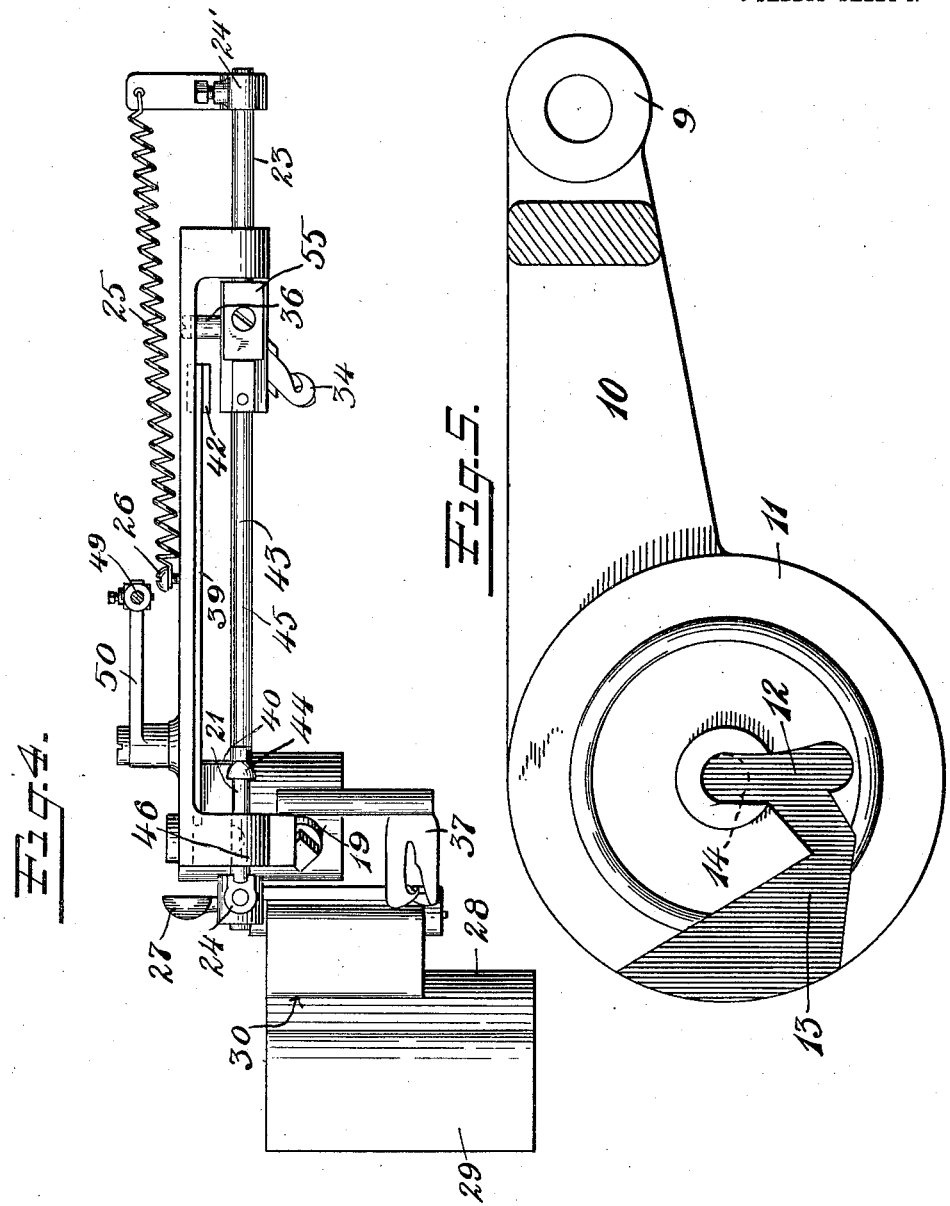

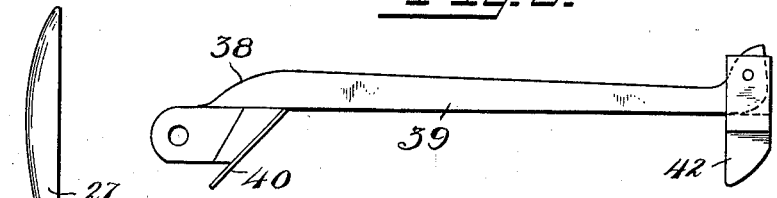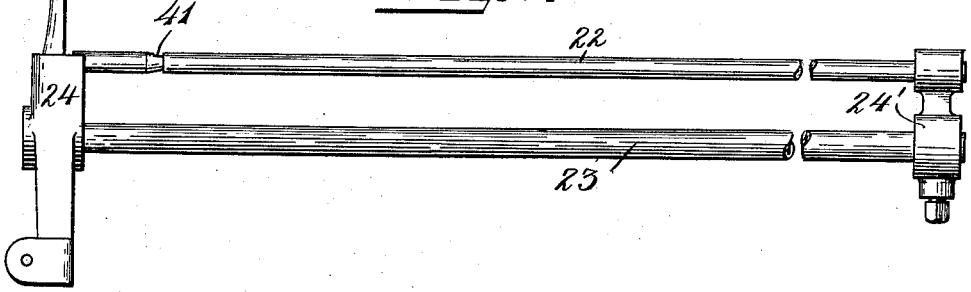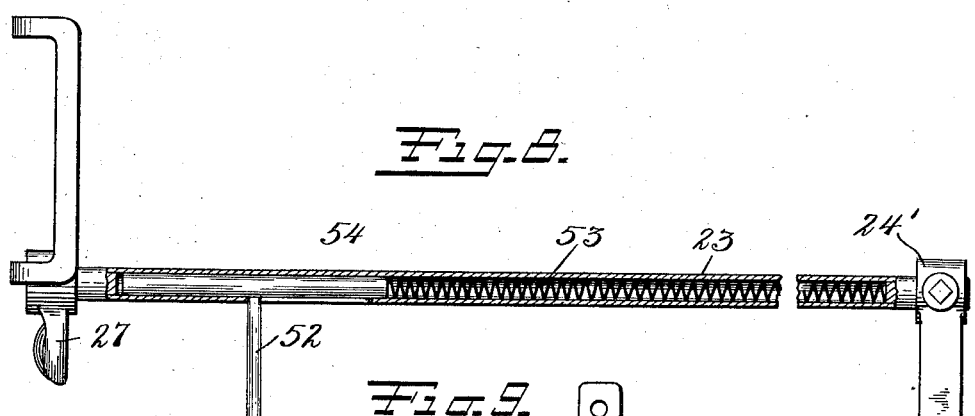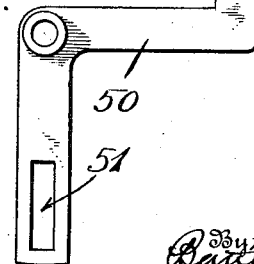

H. J. MARX.
WINDING MACHINE.
APPLICATION FILED OCT. 10, 1910.
1,029,703.
Patented June 18, 1912.
6 SHEETS—SHEET 6.
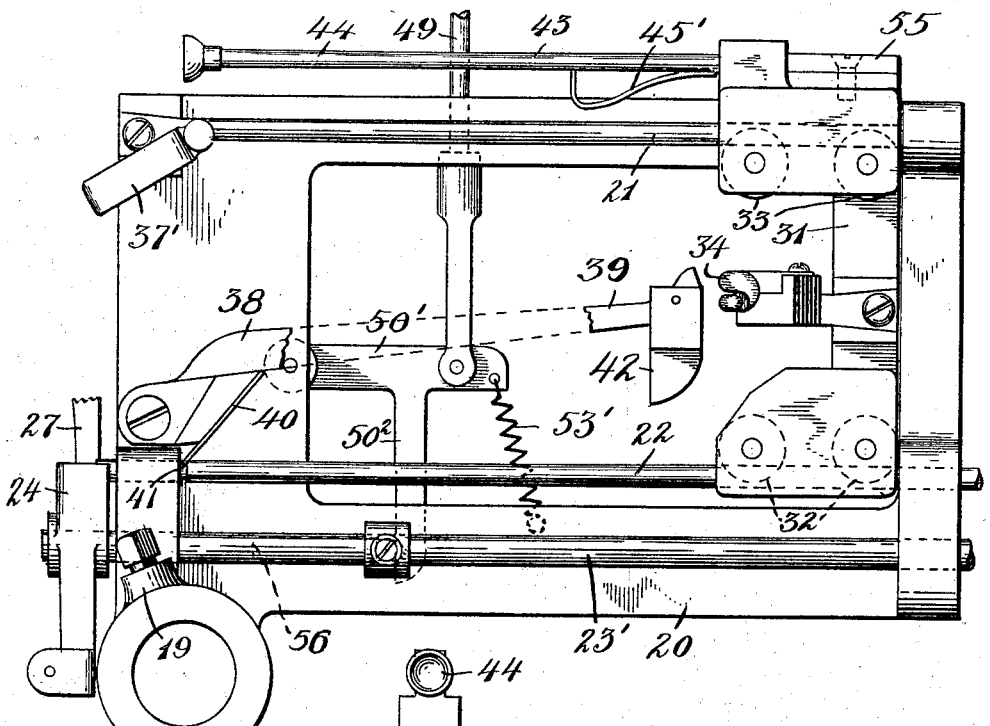
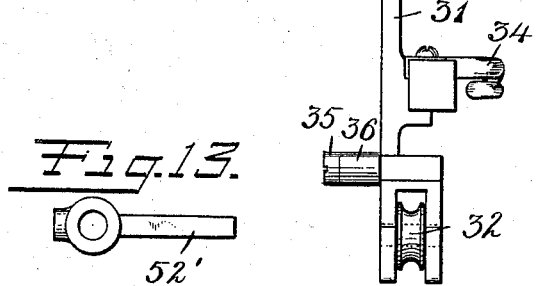
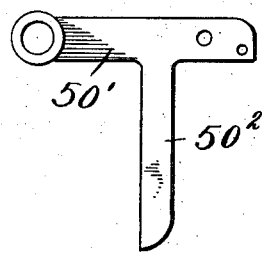
Witnesses:
Inventor
H. J. Marx

UNITED STATES PATENT OFFICE.

HENRY J. MARX, OF HOLYOKE, MASSACHUSETTS, ASSIGNOR TO THE AMERICAN THREAD COMPANY, OF NEW YORK, N. Y., A CORPORATION OF NEW JERSEY.

WINDING-MACHINE.

1,029,703.

Specification of Letters Patent.  Patented June 18, 1912.

Application filed October 10, 1910. Serial No. 586,169.

*To all whom it may concern:*

Be it known that I, HENRY J. MARX, a citizen of the United States, residing at Holyoke, county of Hampden, State of Massachusetts, have invented certain new and useful Improvements in Winding-Machines, of which the following is a full, clear, and exact description.

My invention relates to winding machines for winding thread and the like upon spools or bobbins, being particularly adapted for skein-winding machines, and has for its object to produce a machine in which breaking of the thread will be prevented when the thread becomes seriously caught or tangled, thus eliminating knots which are objectionable, and increasing the rate at which the winding is done.

It further has for its object to produce a winding machine in which when the thread becomes caught or tangled the spool will be automatically stopped and a slack provided in the thread adjacent to the spool.

It further has for its object to produce a machine in which when the thread becomes tangled brakes will be applied to both the spool and swift so as to immediately cause both of them to stop before breaking the thread.

It further has for its object to produce a strain-actuated automatic stopping device which is easily adjustable for threads of different weights.

It further has for its object to produce a winding machine in which the spool is driven at a uniform peripheral winding speed in combination with automatic strain-actuated slack providing means for stopping the spool whenever the thread becomes tangled.

The following is a description of an embodiment of my invention, reference being had to the accompanying drawings, in which—

Figure 1 is a front view of the machine, showing only one of a series of swifts, drums, etc.; Fig. 2 is an end elevation of the same; Fig. 3 is an enlarged view of the stop mechanism for controlling the brakes; Fig. 4 is a plan view of said stop mechanism; Fig. 5 is a side view of one of the internal faces of the spool carrier; Fig. 6 is a detail of the detent; Figs. 7 and 8 are side and bottom views of the sliding member of the stop motion; Fig. 9 is a detail of the swift brake bell-crank; Fig. 10 is a front elevation of the trip; Fig. 11 shows in side elevation a modification of a portion of the frame and trip, and Figs. 12 and 13 show details of the modification.

Referring more particularly to the drawings, 1 is the frame of the machine carrying at its upper end a series of arms 2, upon each of which is mounted a swift 3 on which is placed a skein of thread 4 to be wound upon the disk headed spool or bobbin 5.

6 is a shaft journaled in the frame 1 and carrying a series of drums 7 corresponding in number to the swifts 3, and driven at a high and preferably constant speed by a pulley 8. Pivoted in front of each drum is a spool holder 9 consisting of two arms 10 connected by a yoke and having heads 11 provided with elongated recesses 12 from which channels 13 extend to the periphery of the holder heads 11. These channels 13 enter the recesses 12 midway between their ends, so as to leave a pocket in each end of each of the recesses 12, and, near the recesses 12, at an angle oblique to the axes of said recesses, slanting downward therefrom when the holder is in normal position.

14 is a rod passing through the spool 5, the ends of which can be passed through the channels 13 into the recesses 12, in which recesses 12 they will be held, thus holding the spool between the two holder heads 11. As the bobbin holder 9 is raised or lowered, the rod 14 will drop from one to the other of the pockets of the recesses 12, passing the channels 13 without falling out. If, however, it is desired to remove the spool, this can be easily done by lifting the bobbin holder 9 so as to invert it and then manually moving the spool so that the rod 14 will follow into the channels 13. The bobbin holder 9 when in operative or normal position is held by the weight of its heads 11 in such position that the bobbin rests upon the drum 7, the weight of the heads holding the spool against the drum 7 so as to give it an intimate driving contact therewith.

At one side of the bobbin holder 9 is mounted a sliding guide rod 15 having guide grooves 16 therein, through which the thread being wound passes, the guide rod 15 being reciprocated by any well known traverse motion device 17 driven from a suitable counter-shaft. To the rear of the sliding guide rod 15 is mounted a stationary rod 18 to which are adjustably secured by set screws 19 a series of stop motion devices, there being one for each swift and spool. These stop motion devices consist of a frame 20 having a stationary rod 21 at its upper end and a sliding member at its lower end, the sliding member preferably consisting of a rod 22 and a tube 23 joined together by suitable heads 24, 24′, at their ends. The rear head 24′ has connected to it one end of a spring 25, the other end of which is connected to the stationary frame at 26. The front end of the sliding member is provided with a handle 27 rigidly fixed thereto and with a brake shoe 28 pivoted thereto. This shoe rests on the upper periphery of the driving drum 7 and is provided with a horizontal separating and braking portion 29 and also with a vertical braking surface 30, which, when the movable member is in forward position laterally engages the periphery of the thread upon the spool at a point substantially ninety degrees from the point where the bobbin normally contacts with the driving drum. If the contact with the positive brake surface is substantially ninety degrees from such normal point of contact with the driving drum, the positive braking surface will not lift the bobbin and bobbin holder when the stop motion acts, but the forward end of the shoe will be at that time between the drum 7 and the spool 5 so as to lift the spool from the drum. A positive brake is thus applied to the spool, causing it to come to an immediate stop upon the forward movement of the slide.

Mounted in the head is a trolley releaser or trip consisting of a body 31 light enough to be easily moved by even a fine thread (preferably made of aluminum) provided with antifriction wheels 32 at its lower end bearing upon the movable rod 22 and with antifriction wheels 33 at its upper end bearing upon the rod 21. This trip carries a thread guide 34 and also a stud 35 having an antifriction roller 36. The frame 20 also carries a thread guide 37 and has a pivoted detent 38 having a lever arm 39 and provided at its lower end with a pawl 40 adapted to engage a notch 41 in the upper movable rod 22. The guides 34 and 37 are preferably of porcelain. The rear end of the lever 39 has pivoted thereto a trip-plate 42, which, when the trolley moves forward is engaged by the stud roller 36 thereon so that the lever arm 39 is lifted sufficiently to disengage the pawl 40 from the notch 41 in the movable rod 22. The trip-plate 42 is so pivoted as to yield when the trip 31 moves backward and permit the stud on the trip 31 to pass beneath it without hindrance. To the extreme upper end of the trip 31 is attached a rod 43 provided with a push-button 44 by which the trip 31 can be forced to its rear position in case it does not return to that position automatically by reason of gravity. On the under side of the push-rod is a spring 45 adapted to engage the forward upper end 46 of the frame so as to hold the trip 31 in a handy forward position when it is once brought to that position. In a groove 47 in the swift is a strap brake 48 connected by an adjustable connecting rod 49 to a bell crank 50 mounted on the frame 20. This bell crank 50 has in its lower end a slot 51 through which passes a pin 52, mounted on a block carried by the tube 23, which tube contains a spring 53 bearing against the pin block 54 and tending to hold the pin 52 in a forward position. This spring 53 is weaker than the spring 25 so as to be overcome thereby when the sliding tube 23 is moved to its extreme forward position for the purpose hereinafter stated. The movement of the trip and of the slide which carries the brake shoe are along lines substantially parallel to one another.

The operation of the apparatus is as follows: A skein is placed upon the swift 3 in the ordinary manner and the end of the thread is passed downward through the frame thread guide 37 and thence backward through the trip thread guide 34 upon the movable trip 31, after which it is passed over the traverse or guide rod 15 so as to lie in one of the grooves 16 thereof and about the spool 5 in the bobbin holder, the bobbin holder being at that time preferably in its forward position. The bobbin holder is then swung rearward until the bobbin rests upon the drum 7, or, rather, upon the shoe 28 which at that time overlies the drum. The movable frame, together with the shoe, is then forced backward by pressure upon the handle 27 and the trip is forced backward to its rear position by pressure upon the button 44. The spool immediately begins to revolve by reason of its contact with the drum 7, winding the thread off of the swift 3. In case the thread becomes tangled, the abnormal strain produced thereby draws the trip 31 forward until the stud 35 hits against the trip-plate 42 upon the lever 39 of the detent 38, raising the lever so as to cause the pawl 40 to disengage the notch 41 in the rod 22. When this disengagement takes place, the sliding member together with the brake shoe 28 is forced forward by the spring 25 until the shoe 28 comes between the spool 5 and the drum 7 and the brake surface 30 on the shoe is brought into engagement with the side of the spool 5, stopping the spool at once. At the same time, the pin 52 projecting from the tube 23 in the movable frame, actuates the bell crank lever 50 so as to transmit motion through the rod 49 to the brake strap 48 upon the swift 3, causing the brake strap 48 to bear upon the swift 3 so as to stop it immediately. The movement of the tube 23 varies, being limited by the amount of thread upon the spool, so that except for the presence of the spring 53 acting upon the pin 52, the strap brake 48 would not engage the swift 3 upon the stopping of the spool in both empty and full condition. The adjustment is therefore made so that the brake strap 48 engages the swift 3 when the spool 5 is substantially full without substantial compression of the spring 53. When the spool is empty and the frame and shoe 28 move forward so as to stop it, the spring 53 is overcome by the force of the spring 25, so as to permit the member to move farther forward than a distance sufficient to apply the strap brake 48 to the swift 3. The brakes 48 and 30 are therefore applied to both spool 5 and swift 3 whenever the stop mechanism acts to stop either. The easy forward movement of the trip 31 with its thread guide 34, which results in the stopping of the spool and swift, and by which the thread guide 34 is moved nearer the thread guide 37, provides a slack in the thread between the swift and the spool, which insures the non-breaking of the thread upon the stopping of the spool and swift. This slack also assists the operator in untangling any snarl which may have resulted in the stoppage.

The trip 31 is permitted to have a slight movement along the rods 21, 22 before actuating the trip-plate 42, producing under varying strains a joggling of the thread, which tends to automatically untangle any small snarls or catches of the thread upon the swift, so that only serious tangles or stoppages result in stopping the spool and swift so as to require the attention of the operator.

With the drum drive the thread is laid much more accurately upon the spool than in the old style of winders, and the wind is much firmer, with the result that the amount which can be placed upon the spool is largely increased. The accuracy of the lay also makes the thread run off from the spool with less danger of snarling or catching. The thread is wound onto the spool at a uniform rate, instead of varying as the spool increases in size, as in the old style of spindle driven winders, which rate can be the maximum winding rate. The grooves 16 in the traverse rod are so slight that when the spool 5 is stopped the thread easily slides out of the groove so as not to be worn or broken by the pull of the traverse upon it. The trip 31 always tends to move toward the rear of the frame 20. In the form shown this movement is due to gravity, the rods 21 and 22 being inclined so as to produce the desired result. The tendency to move toward the rearward position can be varied for threads of different weights by adjusting the frame 20 so that the angle of the rods 21 and 22 will be increased or diminished, and also by adding or removing weights 55 from the trip with or without the angular adjustment.

In Fig. 11, I have shown a modification in which the frame guide 37' is mounted higher up on the frame so as to be more out of the way of the trip guide 34 when the guide is in extreme forward position and not interfere with the operator when threading the guide with the trip in that position. With the guide 37' so placed the spring 45' can be placed farther back on the rod so as to hold the trip in the extreme forward position, thereby reducing the reaching that has to be done by the operator. In addition, in the modification shown in Fig. 11, a solid rod 23' has been substituted for the tube 23, and a pin 52' rigidly secured thereto by a set screw has been substituted for the movable pin 52. For the bell-crank 50, the lever shown in Fig. 12 has been substituted, the same consisting of a horizontal arm 50' with a depending arm $50^2$, which lies in the path of the pin 52'. To the rear end of the arm $50^2$ is attached one end of an extension spring 53', the other end of which is secured to the frame. Whenever the sliding member is in forward position so that the pin 52' is separated from the depending arm $50^2$, the spring 53' acts to apply the strap brake 48 to the swift 3. The brake is, therefore, applied to the swift with a uniform pressure entirely independent of the amount of thread upon the spool. When the handle 27 is pressed so as to move the sliding member to its rearward position, the pin 52' engages the depending arm $50^2$, lifting the lever 50' so as to relieve the brake 48 from the swift. In this form as well as in the form shown in Fig. 3, the brake applied to the swift has a lost motion connection with the sliding member restrained by the detent 40 so that, on account of the lost motion between the two brakes, the application of the spool brake does not prevent the application of the swift brake. The swift brake connection of Fig. 11 is advantageous not only because it is more simple to manufacture, but also because the braking action upon the swift is always the same. The pins 52 and 52' pass through slots 56 in the frame 20 which permit them to move freely with the movable member.

My invention permits of various modifications such as will be evident to those skilled in the art without departing from the spirit thereof or the subject-matter referred to in the following claims.

What I claim is:

1. In a machine of the character described, the combination of a spool, a swift for holding thread to be wound thereon, a brake for said spool, a brake for said swift and strain actuated means controlled by the thread being wound for applying said brakes to stop said spool and swift when the tension on the thread being wound becomes abnormally great.

2. In a machine of the character described, the combination of a thread holder for the thread to be wound, a spool on which the thread is to be wound, means for driving the spool and a strain actuated stop mechanism engaging said thread between said holder and said spool, said stop motion having a brake engaging said spool and a brake engaging said holder, one of said brakes having a lost motion connection relatively to the other, and means for applying said brakes.

3. In a machine of the character described, the combination of a thread holder for the thread to be wound, a spool on which the thread is to be wound, means for driving the spool, positive brakes for engaging said spool and said holder, means normally tending to move said brakes toward braking position, a detent for restraining said brakes in off position, and a strain actuated trip for releasing said detent, engaged by said thread between said holder and said spool and normally tending toward non-releasing position.

4. In a machine of the character described, the combination of a thread holder for the thread to be wound, a spool on which the thread is to be wound, means for driving the spool, brakes for engaging said spool and said holder, means normally tending to move said brakes toward braking position, a detent for restraining said brakes in off position, and a strain actuated trip for releasing said detent engaged by said thread between said holder and said spool and normally tending toward non-releasing position, one of said brakes having lost motion relatively to the other.

5. In a winding machine, the combination of a driving drum, a spool normally contacting therewith, a shoe for separating said spool and said drum, having portions adapted to engage said spool at a point between said drum and said spool and at another point at least substantially ninety degrees from the point where the drum normally engages said spool, and means for moving said shoe toward said spool.

6. In a machine of the character described, the combination of a thread holder for the thread to be wound, a spool on which the thread is to be wound, a strain actuated stop mechanism engaging said thread between said holder and said spool, a horizontal driving drum normally engaging the lower part of the periphery of said spool, and a shoe actuated by said stop mechanism, said shoe having a projecting spool lifting portion for separating said drum from said spool, and a braking surface adapted to engage said spool at a point at least substantially ninety degrees from the point where said drum normally engages said bobbin.

HENRY J. MARX.

Witnesses:
ROBERT KERR CLARK,
J. L. BUGBEE.

---

Copies of this patent may be obtained for five çents each, by addressing the "Commissioner of Patents, Washington, D. C."